US010696230B2

(12) United States Patent
Hallack et al.

(10) Patent No.: US 10,696,230 B2
(45) Date of Patent: Jun. 30, 2020

(54) REARVIEW UNIT WITH CLUTCH FOR AUTOMATED TILT MECHANISM

(71) Applicant: Gentex Corporation, Zeeland, MI (US)

(72) Inventors: Jason D. Hallack, Allendale, MI (US); Ulrich A. Kuester, Spring Lake, MI (US); Danny L. Minikey, Jr., Fenwick, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/006,068

(22) Filed: Jun. 12, 2018

(65) Prior Publication Data

US 2018/0354420 A1    Dec. 13, 2018

Related U.S. Application Data

(60) Provisional application No. 62/518,062, filed on Jun. 12, 2017.

(51) Int. Cl.
*B60R 1/04* (2006.01)
*F16H 19/00* (2006.01)
*B60R 1/12* (2006.01)

(52) U.S. Cl.
CPC .......... *B60R 1/04* (2013.01); *B60R 1/12* (2013.01); *F16H 19/001* (2013.01); *B60R 2001/1215* (2013.01); *B60R 2001/1253* (2013.01)

(58) Field of Classification Search
CPC ..... B60R 1/04; B60R 1/12; B60R 2001/1215; B60R 2001/1253; F16H 19/001
See application file for complete search history.

(56) References Cited

U.S. PATENT DOCUMENTS

| 3,063,529 | A | * | 11/1962 | Cook ................ F16D 23/04 192/53.5 |
| 3,421,728 | A | | 1/1969 | Gordon |
| 3,467,465 | A | | 9/1969 | Van Noord |
| 4,895,337 | A | | 1/1990 | Oksam et al. |
| 4,948,242 | A | | 8/1990 | Desmond et al. |
| 5,956,181 | A | | 9/1999 | Lin |
| 6,318,870 | B1 | | 11/2001 | Spooner et al. |

(Continued)

FOREIGN PATENT DOCUMENTS

WO    2016125465 A1    11/2016

*Primary Examiner* — Cara E Rakowski
*Assistant Examiner* — Magda Cruz
(74) *Attorney, Agent, or Firm* — Price Heneveld LLP; Bradley D. Johnson

(57) ABSTRACT

A rearview mirror for a vehicle includes a substrate having a reflective surface thereon and an actuation mechanism coupled within the substrate. The actuation mechanism includes a socket plate rotatably coupled within the cavity of the housing at a first end thereof and extending to a second end and a link element rotatably coupled within the cavity of the housing adjacent the second end of the socket and engaged with the socket plate to rotate the socket plate about the first end by rotation of the link element. The actuation mechanism further includes a clutch plate rigidly coupled with the link element about an axis thereof and an input element positioned on, rotatable about, and slideable along the axis of the link element. The input element releasably engages the clutch plate under a force applied thereto along the axis.

17 Claims, 13 Drawing Sheets

(56) References Cited

U.S. PATENT DOCUMENTS

| | | |
|---|---|---|
| 6,321,159 B1 | 11/2001 | Nohtomi et al. |
| 6,349,450 B1 | 2/2002 | Koops et al. |
| 6,520,667 B1 | 2/2003 | Mousseau |
| 6,549,691 B1 | 4/2003 | Street et al. |
| 6,567,574 B1 | 5/2003 | Ma et al. |
| 6,648,477 B2 | 11/2003 | Hutzel et al. |
| 6,711,314 B1 | 3/2004 | Mori et al. |
| 6,922,500 B2 | 7/2005 | Huang et al. |
| 6,934,438 B2 | 8/2005 | Hoke |
| 6,947,629 B2 | 9/2005 | Chu et al. |
| 7,255,451 B2 | 8/2007 | McCabe et al. |
| 7,329,013 B2 | 2/2008 | Blank et al. |
| 7,510,287 B2 | 3/2009 | Hook |
| 7,722,199 B2 | 5/2010 | DeWard et al. |
| 7,888,629 B2 | 2/2011 | Heslin et al. |
| 7,916,009 B2 | 3/2011 | Schofield et al. |
| 8,351,454 B2 | 1/2013 | Jain et al. |
| 8,817,359 B2 | 8/2014 | Chau |
| 9,041,806 B2 | 5/2015 | Baur et al. |
| 9,338,528 B2 | 5/2016 | Borkenhagen et al. |
| 9,475,431 B2 | 10/2016 | Brummel et al. |
| 9,529,157 B2 | 12/2016 | Zhang et al. |
| 2002/0047378 A1 | 4/2002 | Bingle et al. |
| 2002/0159171 A1 | 10/2002 | Schnell et al. |
| 2003/0011908 A1 | 1/2003 | Marusawa et al. |
| 2003/0137757 A1 | 7/2003 | Wachi |
| 2004/0148102 A1 | 7/2004 | McCarthy et al. |
| 2004/0263988 A1 | 12/2004 | Lin |
| 2005/0068647 A1 | 3/2005 | Brandt |
| 2005/0213978 A1 | 9/2005 | Yamashita et al. |
| 2005/0248847 A1 | 11/2005 | Weimer et al. |
| 2006/0050018 A1 | 3/2006 | Hutzel et al. |
| 2007/0279756 A1 | 12/2007 | Rosario et al. |
| 2008/0049344 A1* | 2/2008 | DeWard ............... B60R 1/04 359/877 |
| 2008/0055757 A1 | 3/2008 | Uken et al. |
| 2008/0077882 A1 | 3/2008 | Kramer et al. |
| 2008/0225538 A1 | 9/2008 | Lynam et al. |
| 2009/0040306 A1 | 2/2009 | Foote et al. |
| 2009/0272614 A1* | 11/2009 | Watarai ............... F16D 3/10 192/70.17 |
| 2010/0046104 A1 | 2/2010 | Rimac |
| 2011/0176323 A1 | 7/2011 | Skiver et al. |
| 2011/0188122 A1 | 8/2011 | Habibi et al. |
| 2013/0107347 A1 | 5/2013 | Chau |
| 2013/0279014 A1 | 10/2013 | Fish, Jr. et al. |
| 2014/0347488 A1 | 11/2014 | Tazaki et al. |
| 2016/0129842 A1 | 5/2016 | Kuester |
| 2016/0250973 A1 | 9/2016 | Kuester et al. |
| 2016/0250974 A1* | 9/2016 | Kuester ............... B60R 1/04 348/148 |
| 2017/0120829 A1* | 5/2017 | Hasegawa ........... H04N 5/2351 |

\* cited by examiner

REARVIEW UNIT WITH CLUTCH FOR AUTOMATED TILT MECHANISM

CROSS-REFERENCE TO RELATED APPLICATION

This application claims priority to and the benefit under 35 U.S.C. § 119(e) of U.S. Provisional Patent Application No. 62/518,062, filed on Jun. 12, 2017, entitled AUTO TILT CLUTCH MECHANISM, the entire disclosure of which is hereby incorporated herein by reference.

TECHNOLOGICAL FIELD

The present disclosure relates generally to a full-display rearview mirror for a motor vehicle and, more particularly, relates to a mechanism for automatic movement of the display mirror substrate between active and inactive positions.

SUMMARY

According to an aspect of the present disclosure, a rearview mirror for a vehicle includes a substrate having a reflective surface thereon and an actuation mechanism coupled within the substrate. The actuation mechanism includes a socket plate rotatably coupled within the cavity of the housing at a first end thereof and extending to a second end and a link element rotatably coupled within the cavity of the housing adjacent the second end of the socket and engaged with the socket plate to rotate the socket plate about the first end by rotation of the link element. The actuation mechanism further includes a clutch plate rigidly coupled with the link element about an axis thereof and an input element positioned on, rotatable about, and slideable along the axis of the link element. The input element releasably engages the clutch plate under a force applied thereto along the axis.

These and other features, advantages, and objects of the present device will be further understood and appreciated by those skilled in the art upon studying the following specification, claims, and appended drawings.

DETAILED DESCRIPTION OF EMBODIMENTS

Figure 1:
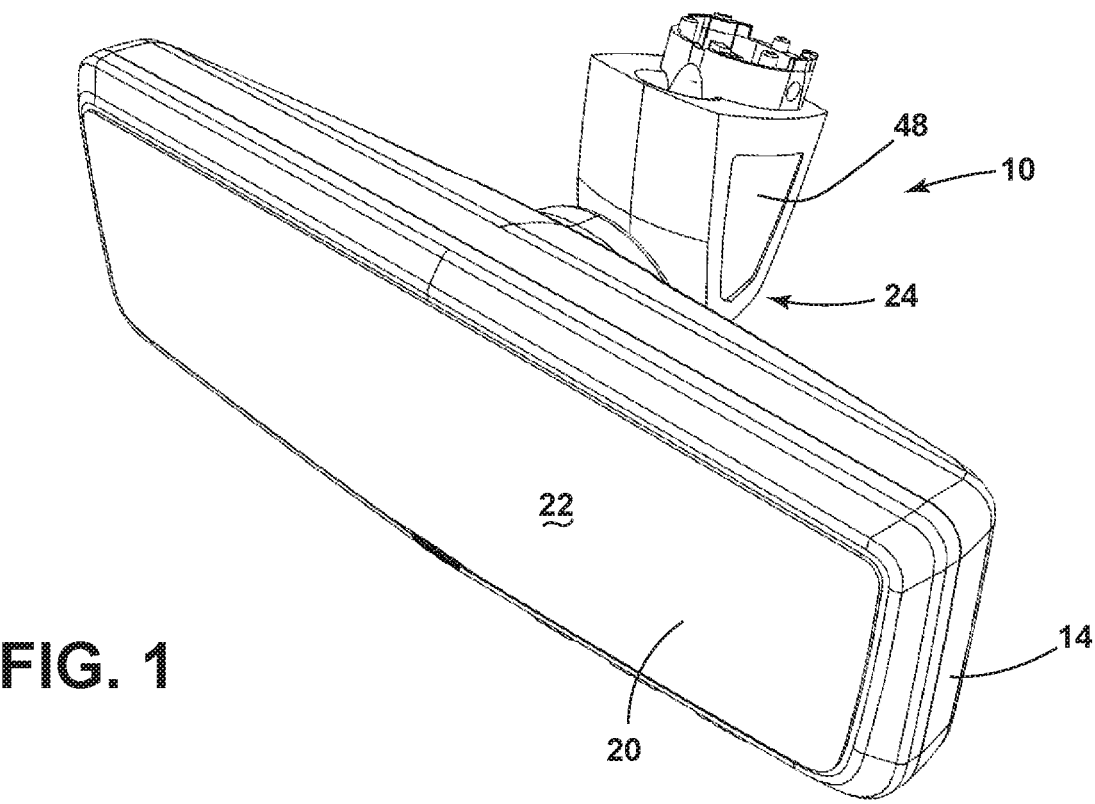
FIG. 1 is a front perspective view of a rearview mirror including an actuation mechanism according to an aspect of the disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-15, reference numeral 10 generally designates a rearview mirror for a vehicle 12. Rearview mirror 10 includes a substrate 20 having a reflective surface 22 thereon, and an actuation mechanism 24 coupled with the substrate 20. Actuation mechanism 24 includes a socket plate 26 rotatably coupled with substrate 20 a first end 28 thereof and extending to a second end 30, and a link element 32 rotatably coupled within the cavity 16 of the housing 14 adjacent the second end 30 of the socket plate 26 and engaged with the socket plate 26 to rotate the socket plate 26 about the first end 28 by rotation of the link element 32. Actuation mechanism 24 further includes a clutch plate 34 rigidly coupled with the link element 32 about an axis 36 thereof and an input element 38 positioned on, rotatable about, and slideable along the axis 36 of the link element 32, the input element 38 releasably engaging the clutch plate 34 under a force applied thereto along the axis 36.

Figure 3:
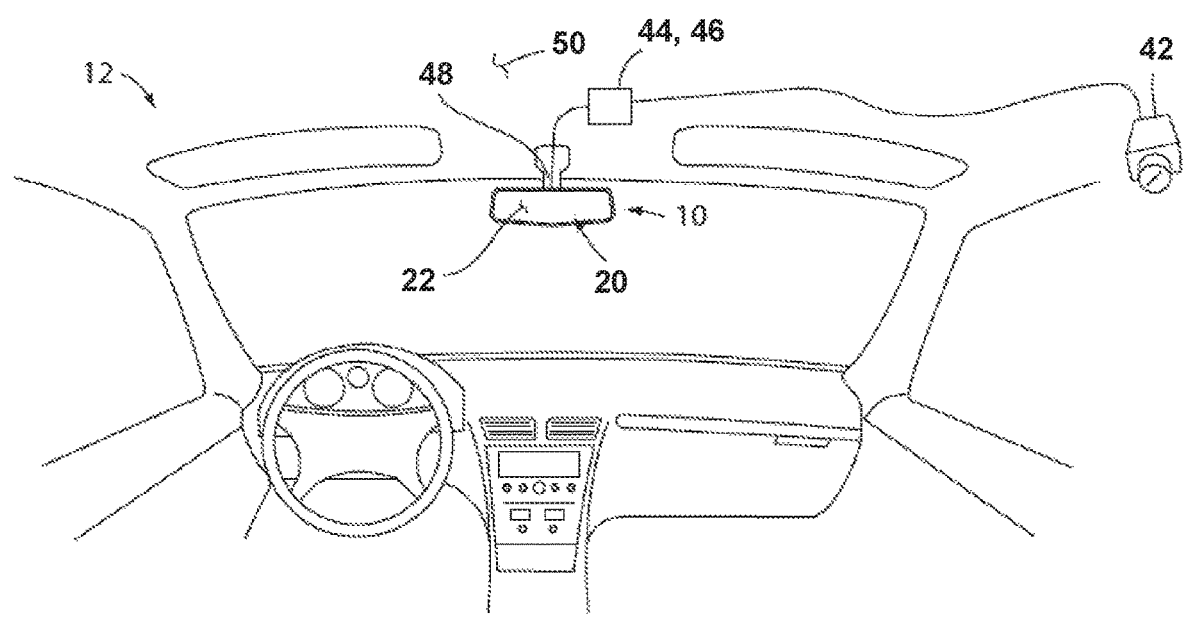
FIG. 3 is a perspective view of an interior of a vehicle incorporating the rearview mirror of claim 1 into a rear-vision system for the vehicle.

As shown in FIG. 3, rearview mirror 10 can be used in connection with interior of vehicle 12, including as a portion of a rearview vision system. In one embodiment, substrate 20 can include a video display screen along a portion or an entirety thereof such that rearview mirror 10 is what may be referred to as a "display" or a "full display" mirror. Substrate 20, when including such a display, is referred to herein as "display substrate" 20 and may be capable of displaying an image replicating that which would be available from a typical reflective mirror by receiving an image from an appropriately-positioned video camera 42 or the like when the display is in an "active" state. Such an image can be supplemented with other information presented on display substrate 20. In combination with such a display substrate 20, reflective surface 22 may be applied thereover as a coating or separate element having properties of a one-way mirror to both provide a reflected image as well as to permit the video image of display substrate 20 to be visible therethrough. As further illustrated in FIG. 3, rearview mirror 10 can be electronically connected with camera 42 by electronic circuitry 44 within vehicle 12. Further, control circuitry 44 can be provided to both cause display substrate 20 to display the image from camera 42 and to implement corresponding movement of substrate 20 by way of control of the actuation mechanism 24, as described in further detail herein. Circuitry 44 can further be connected with an on-board computer 46 to, for example, receive information regarding a state of the vehicle 12, for use by circuitry 44, as also discussed further below.

In connection with such an arrangement, actuation mechanism 24 can move substrate 20 about a mounting arm 48 that secures rearview mirror 10 within the interior 40 of vehicle 12 by rotation of substrate 20 about first end 28 of socket plate 26 (FIG. 4), which is coupled with mounting arm 48. Such movement can be useful to position substrate 20 according to whether or not the display is in an off state or an on state. In this manner, when display substrate 20 is in an inactive state (when the display is "off" or when no image is otherwise presented thereon), as depicted in FIG. 5, reflective surface 22 may be intended to be used and/or positioned to allow rearview mirror 10 to act as a typical rearview mirror, meaning that substrate 20 is intended to be positioned such that an image to the rear of vehicle 12 is reflected toward the driver of vehicle 12.

When in the above-described active state, however, the presence of the reflective surface 22 over display substrate 20 can cause the image reflected by reflective surface 22 to compete with an image presented on display substrate 20. To alleviate such image competition, substrate 20 can be moved such that reflective surface 22 reflects an image of the headliner 50 toward the driver. Because vehicle headliners are of generally consistent, non-reflective material, such an image may compete less with the video image of display substrate 20. Accordingly, rearview mirror 10, by way of the actuation mechanism 24 can provide for automatic repositioning of display substrate 20 between an appropriate position thereof for use of reflective surface 22 when display substrate 20 is in the inactive state and for viewing of a displayed image, without undesirable competition, when display substrate 20 is in an active state.

Figure 5:
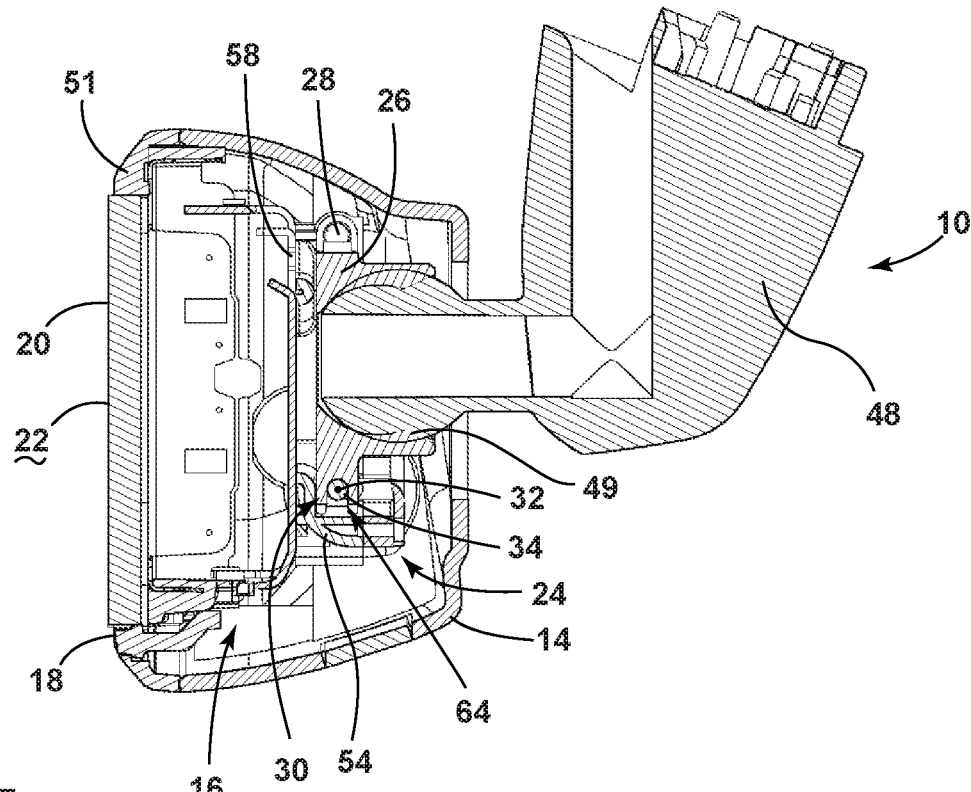
FIG. 5 is a cross-section view of the rearview mirror of FIG. 1 with the actuation mechanism thereof in a first position.

As shown in FIG. 5, when display substrate 20 is inactive, rearview mirror 10 can be configured such that display substrate 20 is in a first position. The exact orientation of display substrate 20 can be adjusted by a user for use of reflective surface 22 when display substrate 20 is inactive by movement of display substrate 20 by, for example, manipulation of the external housing 14 of rearview mirror 10, which is affixed to substrate 20 by way of bezel 51, about mounting arm 48. Mounting arm 48 may couple with socket plate 26 by way of the ball-and socket joint 49 therebetween. In this manner, although socket plate 26 is shown as including the socket portion of joint 52, the configuration of parts within joint 49 can be reversed. With actuation mechanism 24 maintaining substrate 20 and, accordingly, housing 14 in the first position with respect to socket plate 26, movement of housing 14 causes movement of socket plate 26 about mounting arm 48, thereby providing repositioning of substrate 20.

Figure 6:
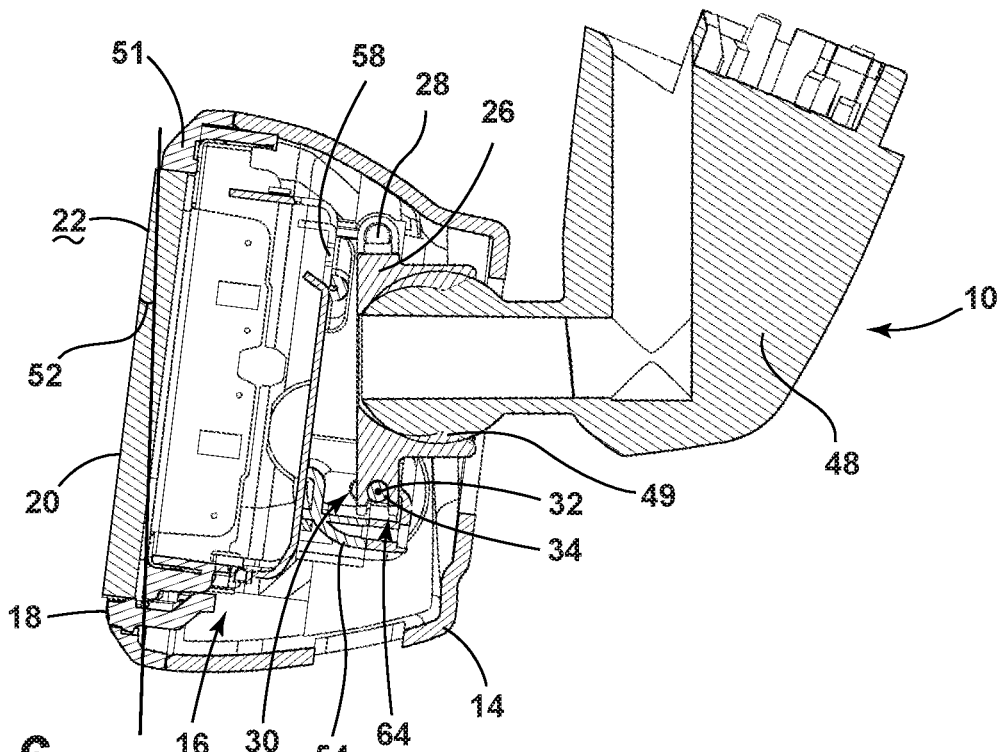
FIG. 6 is a cross-section view of the rearview mirror of FIG. 1 with the actuation mechanism thereof in a second position.
Figure 7:
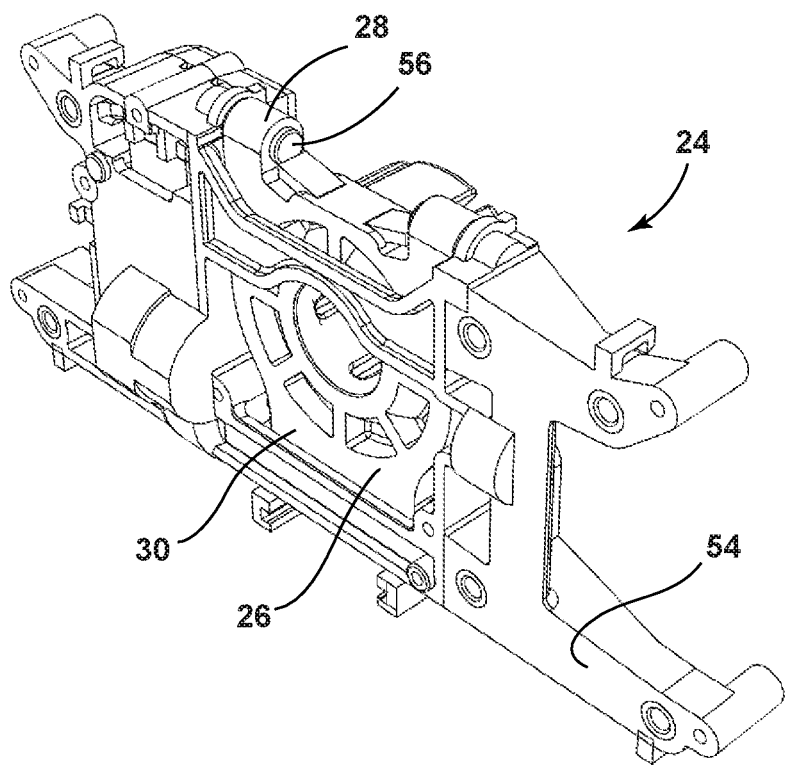
FIG. 7 is a front perspective view of the actuation mechanism.
Figure 8:
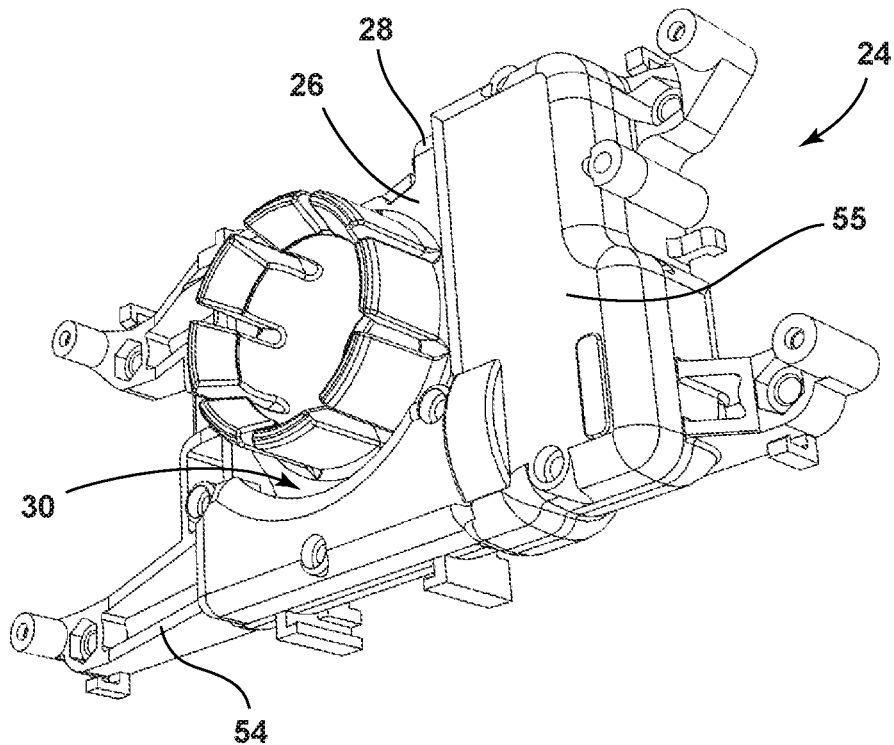
FIG. 8 is a back perspective view of the actuation mechanism.
Figure 9:
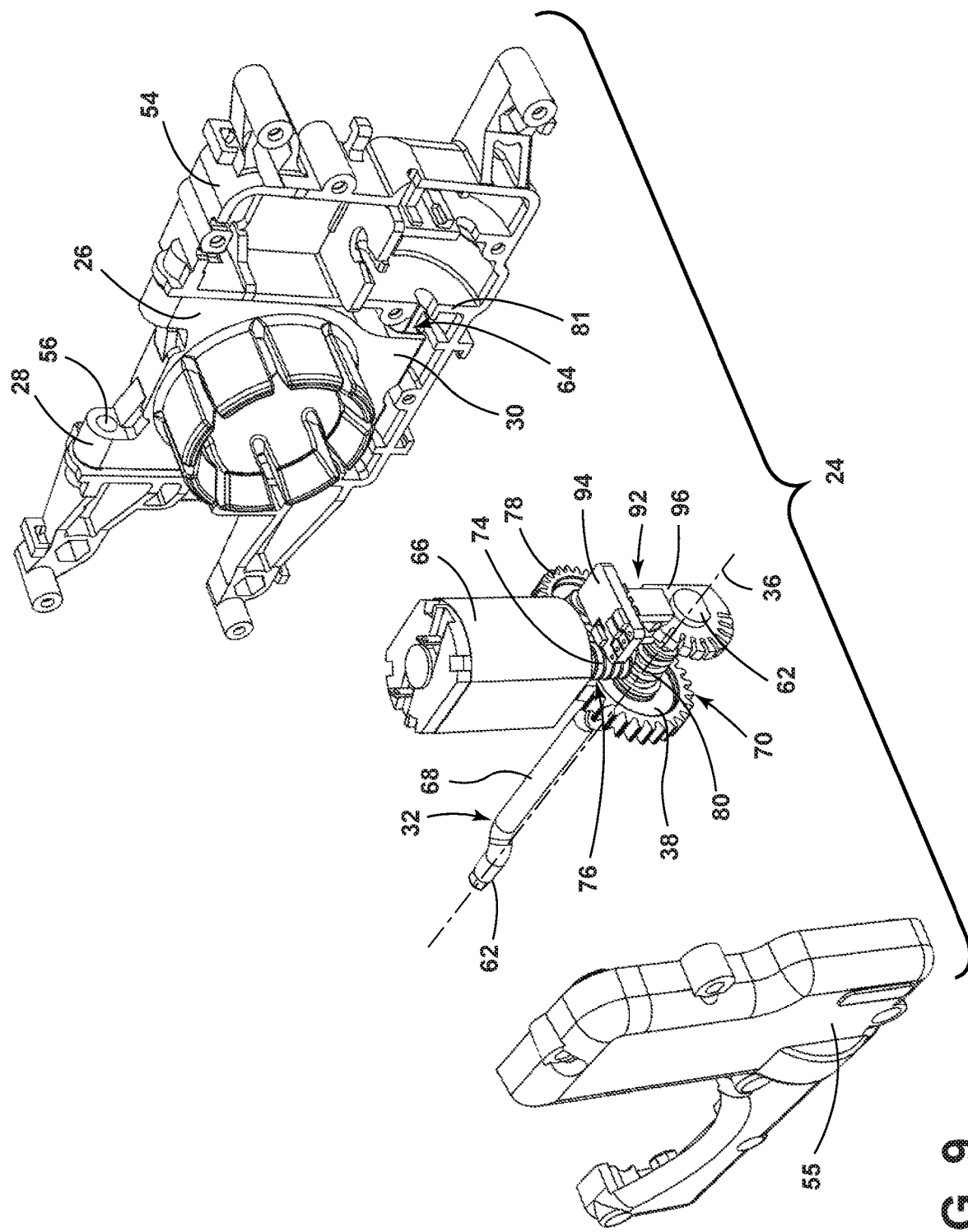
FIG. 9 is an exploded view of the actuation mechanism.
Figure 10:
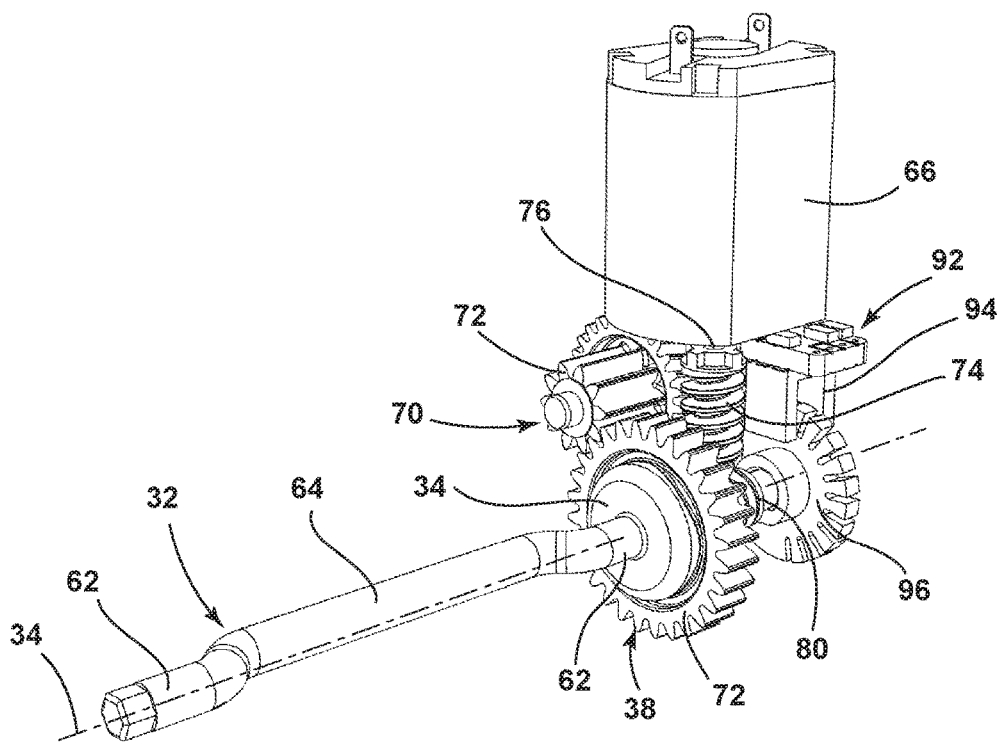
FIG. 10 is a perspective view of a drivetrain of the actuation mechanism.
Figure 11:
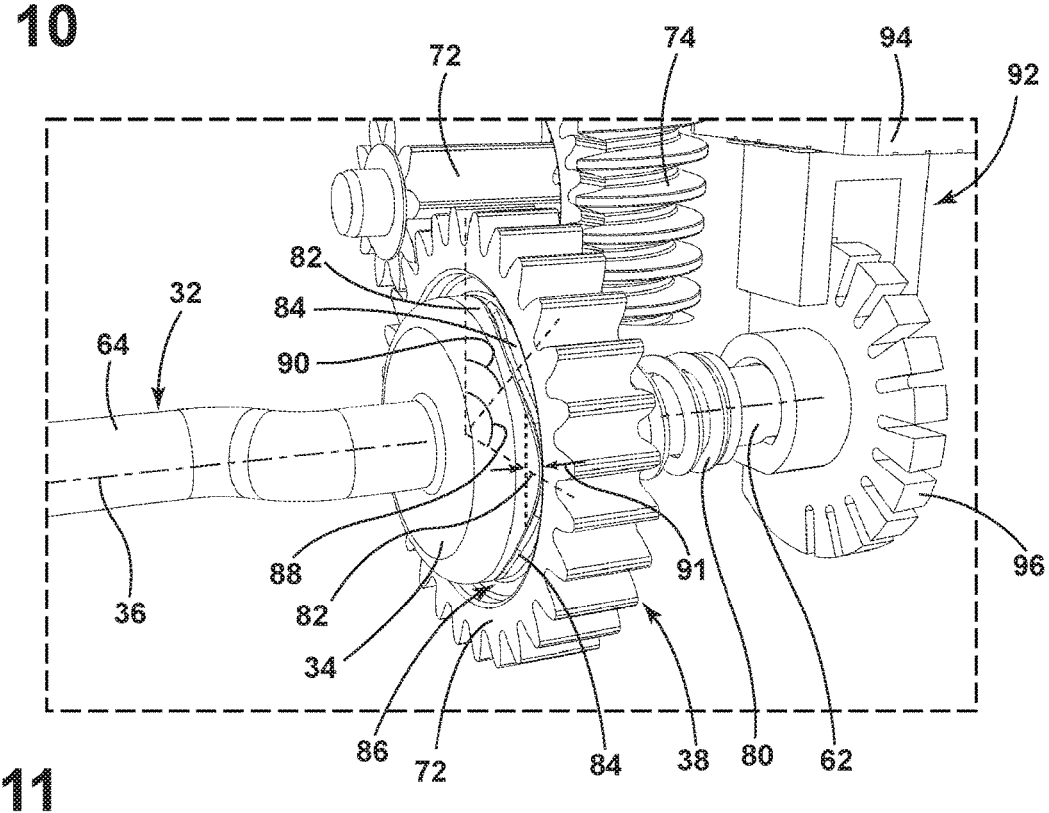
FIG. 11 is a detail perspective view of a clutch mechanism of the drivetrain.

Upon activation of the display substrate 20, actuation mechanism 24 can cause display substrate 20 to tilt upward with respect to socket plate 26, through a predetermined angle 52, thereby orienting reflective surface 22 toward headliner 50 (FIG. 2), as shown in FIG. 6. Such orientation can be achieved by tilting substrate 20 with respect to socket plate 26 about first end 28 thereof through angle 52 of between about 5° and about 10° and, in one embodiment, about 7°, although such an angle can vary based on the location and structure of actuation mechanism 24. Upon deactivation of display substrate 20, actuation mechanism 24 can return display substrate 20 to the orientation shown in FIG. 5.

Figure 4:
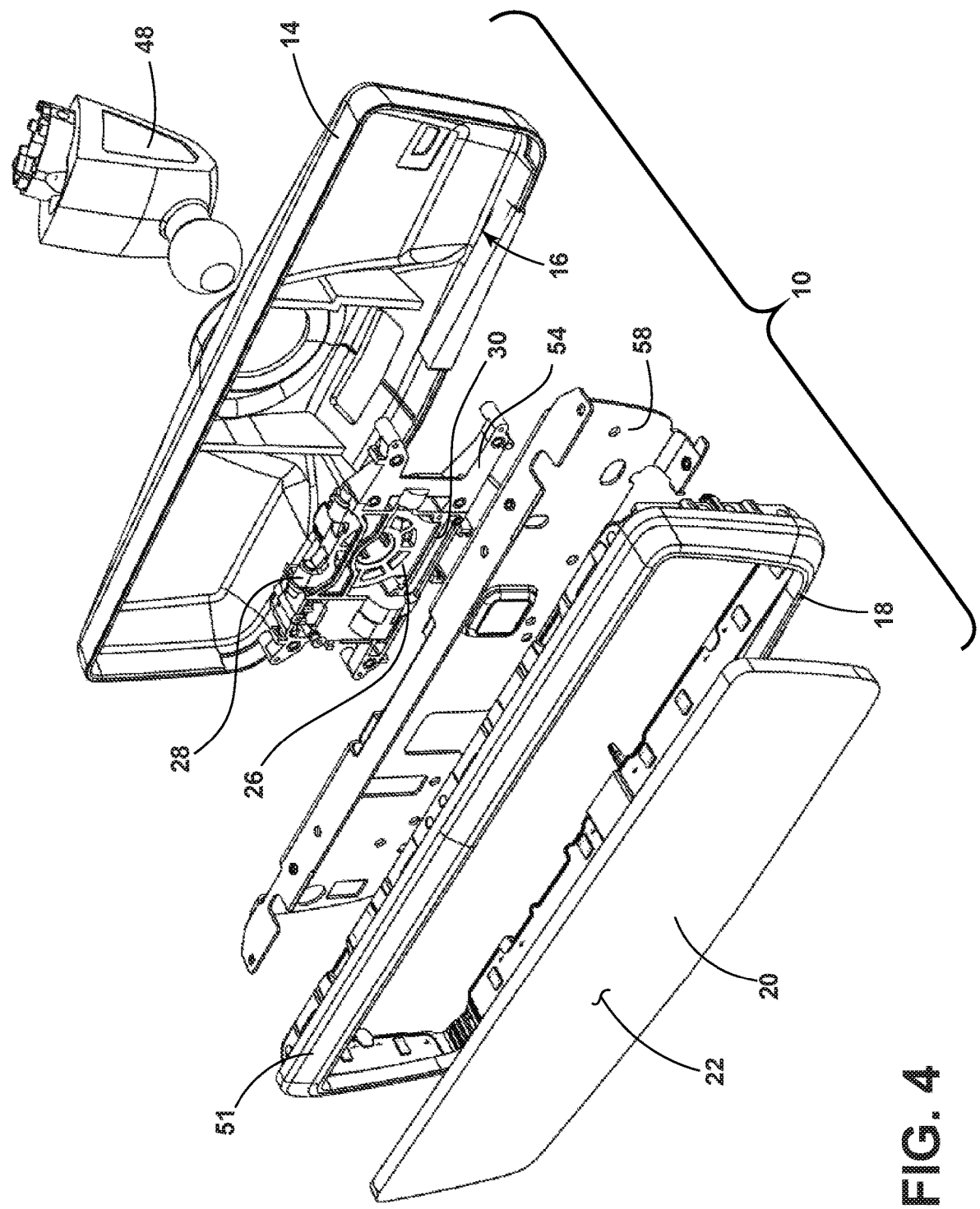
FIG. 4 is an exploded view of the rearview mirror of FIG. 1.

As shown in the exploded view of FIG. 4, substrate 20 can be coupled with socket plate 26 by way of a mounting plate 54 included within actuation mechanism 24, which itself can be coupled with socket plate 26 by a hinge mechanism 56 (FIG. 7) to first end 28 of mounting plate 54. In the depicted example, substrate 20 can be coupled with a heat sink 58 that can, in turn, be coupled with mounting plate 54. In this arrangement, the above-described coupling of substrate 20 with socket plate 26 can be achieved by the hinged connection of mounting plate 54 with socket plate 26, and the movement of substrate 20 through angle 52 can be achieved by relative movement between mounting plate 54 and socket plate 26 about hinge 56.

Turning to FIGS. 7-15, actuation mechanism 24 is shown in greater detail, including the operation thereof to move mounting plate 54 relative to socket plate 26. In particular, link element 32 can be seen as operatively coupling second end 30 of socket plate 26 with mounting plate 54. As shown, link element 32 includes outer portions 60 that engage with mounting plate 54 in a manner such that link element 32 is rotatable about axis 36. It is noted, that although two outer portions 60 are incorporated in the present example of actuation mechanism 24 for stability, arrangements with a single outer portion 60 are possible. An inner portion 62 is offset from outer portions 60 and from axis 36 such that rotation of link element 32 about axis 36 causes movement of inner portion 62 about axis 36. Socket plate 26 is coupled with inner portion 62 of link element 32. In this manner, the movement of mounting plate 54 with respect to socket plate 26 is achieved by the rotation of inner portion 62 with respect to mounting plate 54 and the corresponding component of movement of inner portion 62 with respect to first end 28 of socket plate 26. In this manner, that movement component of inner portion 62 causes movement of second end 30 of socket plate 26 about hinge 56 with respect to mounting plate 54 (or vice-versa, depending on the frame of reference). To facilitate this movement, socket plate 26 receives inner portion 62 of link element 32 within a slot 64 that is shaped to restrict movement of inner portion 62 therein in a direction tangential to the rotation of second end 28 of socket plate 26 about hinge 56, but to allow movement of inner portion 62 in a direction normal to such tangent. In this manner, only movement of inner portion 62 in the component of its movement about axis 36 is translated to socket plate 26, thereby allowing rotation of link element 32 through a predetermined angle to drive rotation of mounting plate 54 with respect to socket plate 26 by the desired angle 52 for movement thereof. In the illustrated example, rotation of link element 32 can be through an angle of between about 180 degrees and about 185 degrees (and in one embodiment 183.5 degrees), although other configurations can be implemented to achieve the desired movement of substrate 20 through different angles of rotation of link element 32.

As further shown, movement of link element 32 through the predetermined angle of rotation with respect to mounting plate 65 is driven by a motor 66 operatively coupled with input element 38 by a reduction mechanism 70 including a plurality of gears 72 configured to provide the desired torque on link element 32 for movement thereof based on the characteristics of motor 66, as well as the weight of relevant portions of rearview mirror 10 or the like. In the illustrated example, the reduction mechanism 70, in particular, includes a worm gear 74 rigidly coupled with an output shaft 76 of motor 66 and meshing with a helical gear 78, such arrangement allowing positioning of motor 66 at an angle relative to link element 32, included the approximately 90 degree angle depicted in the figures. Additional gears 72 couple the rotation of helical gear 78 with a final gear 72 defined on input element 38, according to the desired reduction ratio, which in the present example is 72:1, although other ratios can be used, depending on the characteristics of motor 66 and the geometry of the components of mirror 10, including those of actuation mechanism 24, for example. Input element 38, as discussed above, is positioned about axis 36, which in the illustrated embodiment is achieved by rotatably and slidably mounting input element 38 on outer portion 60 of link element 32. In this manner, motor 66 is operable to drive rotation of input element 38 about axis 36.

As also discussed generally above, the rotation of input element 38 is transferred to link element 32 by the releasably engagement of clutch plate 34 with input element 38. In particular, the slideable movement of input element 38 allows the above-mentioned force thereto to move input element 38 into contact with clutch plate 34 and to facilitate the engagement between clutch plate 34 and input element 38. In one example, the engagement between clutch plate 34 and input element 38 can be frictional. Additionally or alternatively, and as in the illustrated example, the engagement can be made or facilitated by interlocking features of the facing portions of clutch plate 34 and input element 38. As shown, such interlocking features include a plurality of radially-spaced undulations 82 on clutch plate 34 that extend at regular angular intervals toward the outer edge thereof and matching undulations 84 on an engagement plate 86 portion of input element 38, which are described in greater detail below. As input element 38 is otherwise rotatably decoupled from link element 32, this friction with clutch plate 34 causes rotation of input element 38 to be imparted on clutch plate 34. In this manner, clutch plate 34 can be rigidly coupled with link element 32 such that the rotation of clutch plate 34 by the engagement with input element 38 causes rotation of link element 32 by rotation of input element 38, including by the operation of reduction mechanism 70 by motor 66, as described above.

Figure 12:
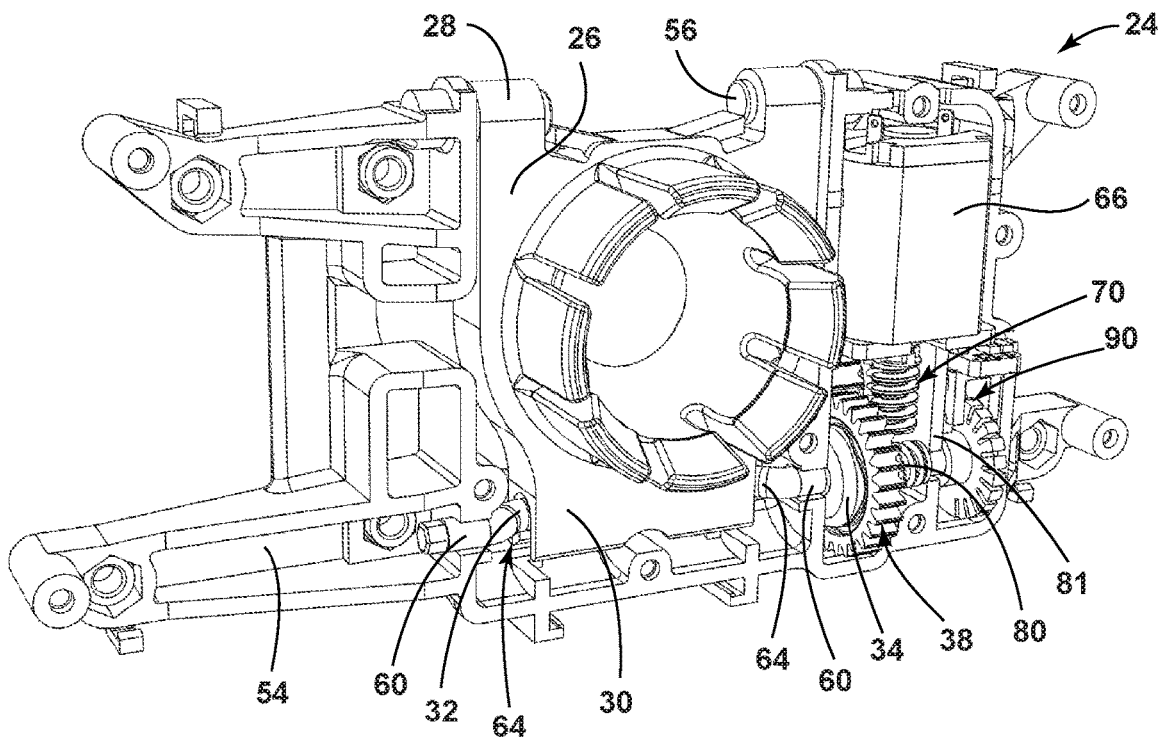
FIG. 12 is a perspective view of the actuation mechanism and the drivetrain in a first configuration.
Figure 13:
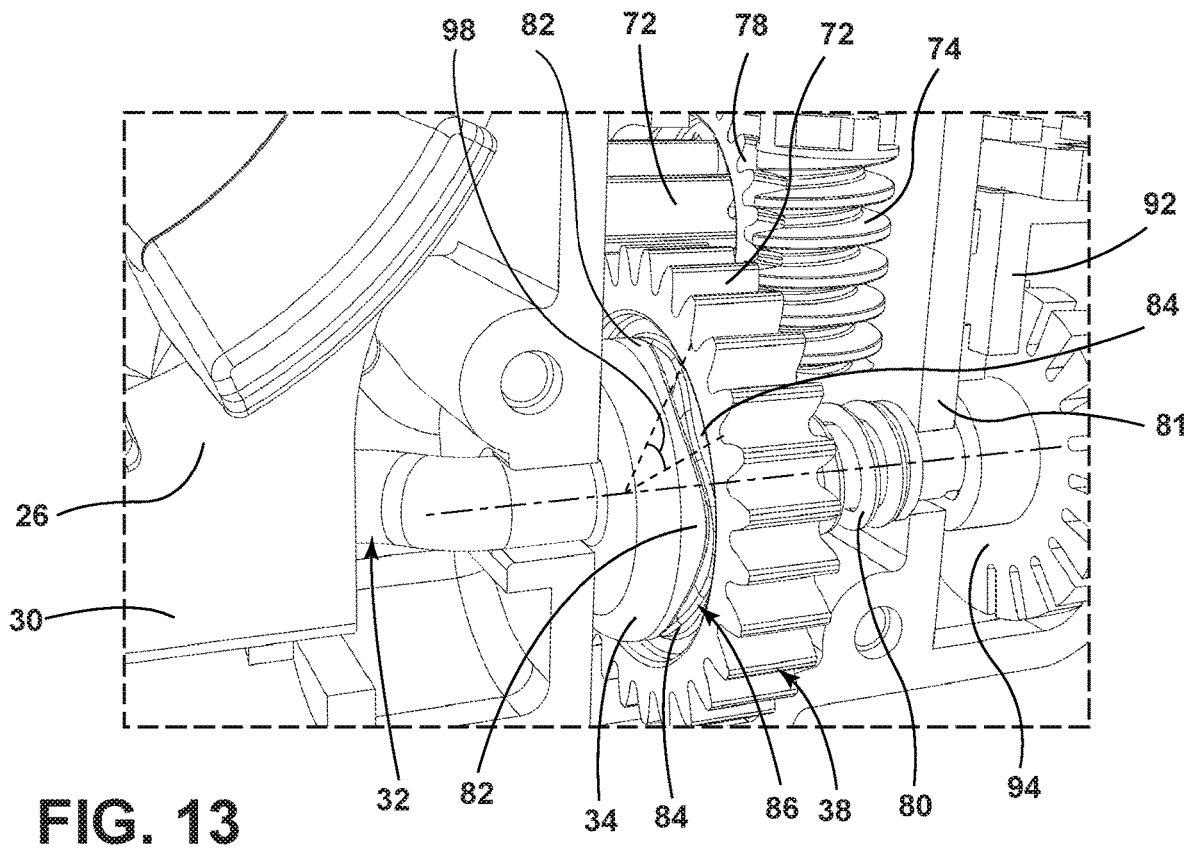
FIG. 13 is a detail perspective view of the clutch mechanism in a first over-rotated condition corresponding with the first configuration.
Figure 14:
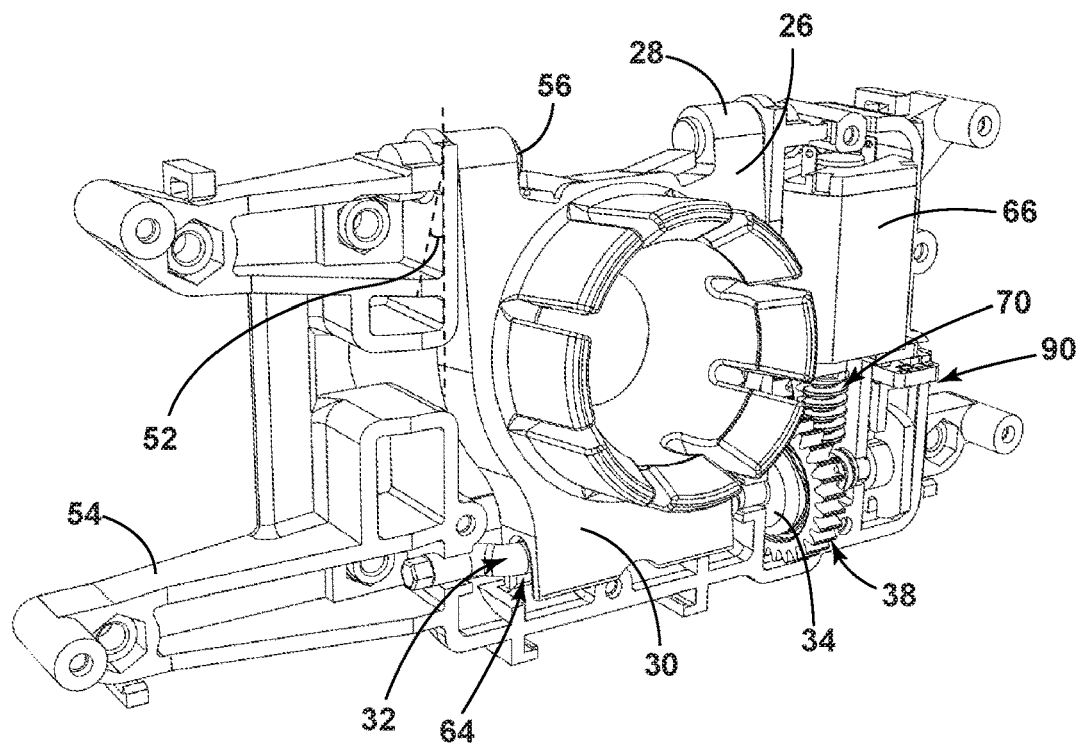
FIG. 14 is a perspective view of the actuation mechanism and the drivetrain in a second configuration.
Figure 15:
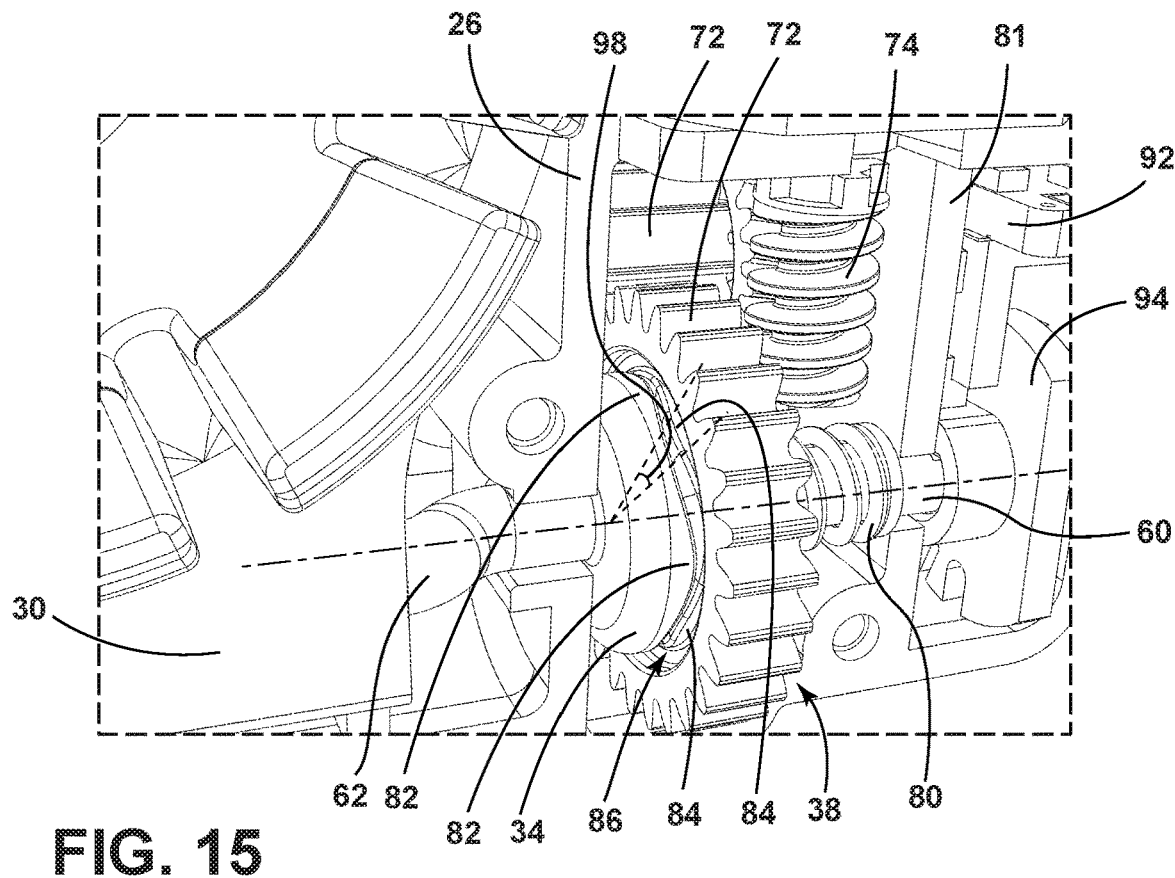
FIG. 15 is a detail perspective view of the clutch mechanism in a second over-rotated condition corresponding with the second configuration.

As shown in FIG. 12 in particular, a spring 80 can be positioned between input element 38 and a portion of actuation mechanism 24 that is laterally fixed with respect to clutch plate 34 and positioned with respect thereto to provide the force for urging input element 38 into contact with clutch plate 34, such as under compression of spring 80. In the example shown in FIG. 12, such a portion can include a rib 81 formed with mounting plate 54, although other arrangements are possible. In one example rib 81 can be spaced from input element 38 such that spring 80 provides a force of between about 20 N and about 25 N of force on input element 38 in a direction toward clutch element, given the characteristics of spring 80. In a further example the force provided by spring 80 can be about 23 N.

Both spring 80 and the interengaging features of clutch plate 34 and engagement plate 86 can be tuned to provide a desired characteristic for the releasable engagement between input element 38 and link element 32 for a desired functionality thereof. In one aspect, the releasable engagement can allow for decoupling between motor 66 and link element 32 in the event of a disruptive force applied on actuation mechanism 24 to prevent jamming or damage to the various components thereof. For example, in the event that the driver or another occupant of vehicle 12 grasps and/or attempts to adjust mirror 10 (i.e. by movement of socket plate 26 about mounting arm 48) during operation or motor 66 to move mirror 10 between the first and second positions by way of actuation mechanism 24, the application of such forces on actuation mechanism 24 may oppose those within actuation mechanism 24, which could damage various parts of actuation mechanism 24 and/or result in incomplete adjustment between positions. In this manner, input element 38 can slip or otherwise continue to move about axis 36 under the force of motor 66 while clutch plate 34 and, accordingly, link element 32 remain stationary. In a similar manner, if a force applied on, for example, housing 14 causes movement of mounting plate 54 relative to socket plate 26, any force transferred to link element 32 by such movement can allow link element 32 to rotate without causing forced rotation of motor 66 by relative movement of clutch plate 34 with respect to input element 38.

The above-mentioned tuning of clutch plate 34, engagement plate 86, and spring 80 can be done in light of the above scenarios to take into account characteristics of actuation mechanism 24, including the strength of the various components and/or the output of motor 66. For example, the shape of undulations 82 and 84 can be such that relative rotation between clutch plate 34 and input element 38 through a predetermined angle requires movement of input element 38 along axis 36 through a corresponding distance against the increasing force of spring 80. In the illustrated example, the undulations 82 and 84 are spaced about axis 36 at an angular interval 88 and extend from respective peaks of the undulations 82 and 84 to respective valleys therebetween through a corresponding height 91. In the present example, the angle 88 can be about 90 degrees, such that each of clutch plate 34 and engagement plate 86 includes four undulations 82 and 84, and the height 91 is about 1.5 mm. In this manner, the characteristics of spring 80 can be selected to provide a desired opposing force to the lateral movement of engagement plate 86. This tuning can also be made in light of the pitch of the undulations 82,84, which may provide greater or lesser mechanical advantage in compressing spring 80, depending on how steep the pitch is and may influence the effect of internal friction between clutch plate 34 and engagement plate 86.

To achieve the desired full movement of mirror 10 between the downward-directed position (FIG. 12) and the upward-directed position (FIG. 14), when called for, actuation mechanism may include a position detection mechanism 92 that can determine the instantaneous position of link element 32 with respect to mounting plate 54 for use by the above-described circuitry 44 in controlling motor 66 to achieve the desired rotation of link element 32 to move mounting plate 54 relative to socket plate 26, which in the illustrated example may be through an angle of about 180 degrees. As illustrated, a variation of the detection mechanism 92 may include an optical sensor 94 coupled with mounting plate 54 and a marker wheel 96 coupled with link element 32. In this implementation, the optical sensor 94 can allow circuitry 44 to track the number of markings passed during rotation in a given direction to determine when full rotation of link element 32 is achieved. This can, in turn, allow circuitry 44 to operate motor 66 in the desired direction until link element 32 has been fully rotated, regardless of whether any decoupling of clutch plate 34 from input element 38 has occurred during operation of motor 66. The user of detection mechanism 92 can also allow circuitry 44 to monitor the speed at which actuation mechanism 24 moves in adjusting the position of substrate 20. In one example, motor 66 may be operated to move mirror 10 between positions over a period of time ranging from 500 ms to about 750 ms. In this manner, motor 66 can be controlled using a pulse-width modulation scheme that can be adjusted to control the operating speed of motor 66, based on information from detection mechanism 92, to achieve movement within the desired time range. Further, such a scheme can be configured to slow motor 66 near the end points of rotation thereof, including in the above-mentioned over-rotation of input element 38.

Still further, information from detection mechanism 92 can also be used to control activation or deactivation of the display substrate 20, which can be done, for example at a midpoint of rotation of link element 32. In an example, display substrate can fade in during movement of mirror 12 between the downward-directed position (FIG. 2) to the upward-directed position (FIG. 3), with the fade-in beginning at the midpoint of movement and being controlled by pulse-width modulation of the image signal to arrive at the fully-active stated by then end or movement into the upward-directed position. An inverse of this scheme can also be used for deactivation of display substrate 20. Alternative arrangements for the position detection mechanism 92, including a 2-part hall effect sensor, with parts respectively coupled with mounting plate 54 and link element 32 are possible, such that movement of link element 32 alters a magnetic flux field in a particular manner that can indicate appropriate positioning of link element 32 for the desired orientation of mirror 10.

In addition to protection of the components of actuation mechanism 24, the above-described relative rotation of input element 32 with respect to clutch plate 34 can be used to help secure actuation mechanism 24 in either of the positions corresponding with the desired positioning of mirror 10. In this respect, when data from the detection mechanism 92 indicates that "full" rotation of link element 32 has been achieved, circuitry 44 can continue to rotate motor 66 by a predetermined amount to cause "over-rotation" of input element 38, while link element 32 remains stationary by opposition from the uppermost portion of slot 64. This over-rotation of input element 38 can result in lateral movement of input element 38 along axis 36 to compress spring 80, as discussed above. In this manner, the amount of over-rotation and the geometry of undulations 82, 84 can be configured such that the opposing lateral force of spring 80 can cause the undulations 84 on engagement plate 86 to apply a torque to the undulations 82 of clutch plate 34, this force serving to forcibly maintain link element 32 in engagement with the upper portion of slot 64. This arrangement can provide a locking effect for actuation mechanism 24 that can reduce slight movement within actuation mechanism 24 and/or vibration therein when motor 66 is inactive. In this manner, the geometry of undulations 82, 84 and the configuration of spring 80 can be further tuned to maintain a desired force between link element 32 and slot 64 by the internal friction of reduction mechanism 70 and a known steady-state torque of motor 66 (i.e., an amount of torque needed to drive rotation of motor 66 when inactive) such that the position of input element 38 is maintained when the desired amount of over-rotation has been made and motor 66 is inactive.

As discussed above, the geometry of undulations 82, 84 can be configured to provide the desired dynamic and static operation of actuation mechanism 24 to both prevent unintended operation of mirror 10 and to help stabilize actuation mechanism 24, respectively. In this manner, the angle 98 of over-rotation implemented on input element 38 can correspond with the geometry of undulations 82, 84. As discussed above, the undulations 82 in clutch plate 34 and the undulations 84 on engagement plate 86 can be geometrically similar, including by having the same angular spacing 88, such that, when engaged, the undulations 82 and 84 are out of phase with each other by half of the angular spacing 88. Accordingly, the angle of over-rotation 98 is less than the angular offset 90 between the undulations 82 and 84 of clutch plate 34 and engagement plate 86, respectively. As shown, the angle 98 of over-rotation can be about 50% of the angular offset 90 between clutch plate 34 and engagement plate 86 such that a maximum amount of internal force is maintained, given the depicted geometry of undulations 82, 84. In the depicted example, the over-rotation angle 98 can, accordingly, be between about 22 degrees and 23 degrees, although other angles are possible based on the geometry of undulations, for example, as well as the desired force maintained between input element 38 and link element 32.

Figure 16:
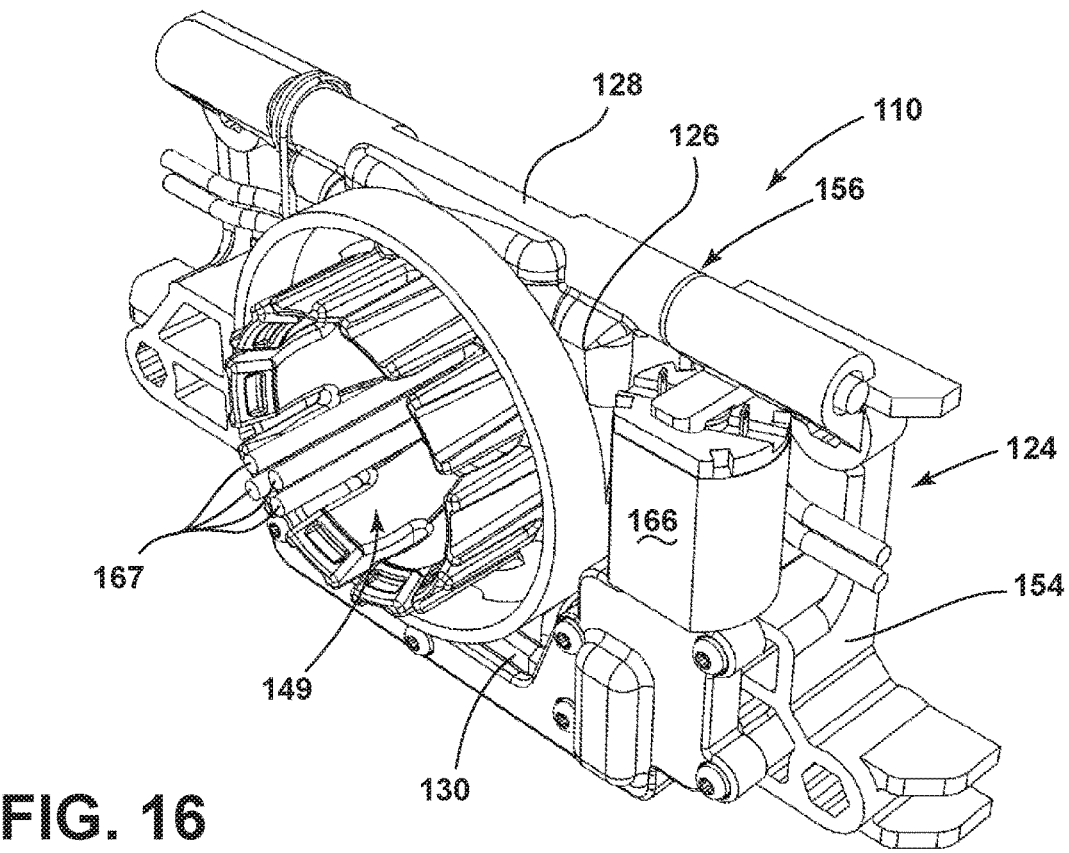
FIG. 16 is a back perspective view of an alternative actuation mechanism according to further aspects of the disclosure.
Figure 17:
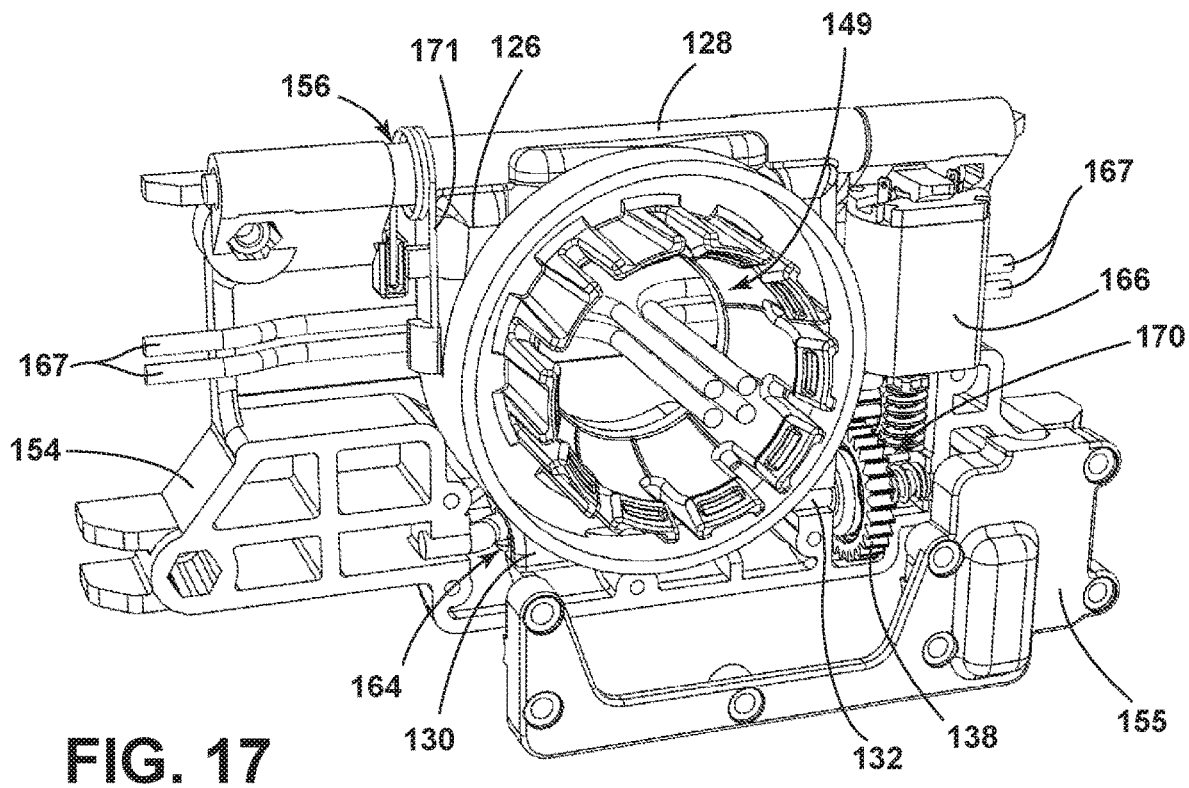
FIG. 17 is a partially exploded view of the actuation mechanism of FIG. 15.

Turning now to FIGS. 16-19, a further variation of a rearview mirror 110 including an actuation mechanism 124 similar to that which is described above is illustrated. The actuation mechanism 124 depicted functions in a similar manner to that which is described above with respect to FIGS. 1-15 for moving an associated reflective substrate between upwardly- and downwardly-directed positions in connection with operation of an integrated display, but includes additional or varied features in connection with certain operational aspects described herein. In one aspect, as illustrated in FIGS. 16 and 17, the cover 155 coupled with mounting plate 154 to enclose the reduction mechanism 170 leaves the motor 166 uncovered (in contrast to the cover 55 depicted in FIG. 9, for example, which encloses the motor 66). The motor 166 is further spaced apart from an underlying portion of mounting plate 154, which facilitates the routing of wires 167 associated with the various electronic components of rearview mirror 110, which may include motor 166, as well as the associated display substrate, into a position that passes beneath motor 166 during assembly of actuation mechanism 124 over the associate mounting arm. In particular, the depicted configuration allows the socket plate 126 to be assembled onto the mounting arm as a first assembly step to ensure that the ball and socket joint 149. In this manner, only the socket plate 126, rather than the entire rearview mirror 110 needs to be replaced, should the joint fail a predetermined torque test. Subsequently, wires 167 are routed through the mounting arm and the joint 149. Then, mounting plate 154 can be assembled onto socket plate 126, followed by the motor 166, the pre-assembled link element 132 and reduction mechanism 170. The cover 155 can then be assembled with mounting plate 154 prior to connection of wires 167 with the desired components and the assembly of additional components onto actuation mechanism 124.

As further shown in FIG. 17, a balancing spring 171 can be engaged between mounting plate 154 and socket plate 126 to counter a portion of the weight of rearview mirror 110 about the first end 128 of socket plate 126. In this manner, balancing spring 171 acts about the first end 128 of socket plate 126 and is configured such that the torque needed by motor 166 to move mounting plate 154 about first end 130 of socket plate 126 in either direction (i.e. from the downwardly-directed position to the upwardly-directed position and vice-versa) is about equal. To that end, when motor 166 moves mounting plate 154 into the upwardly-directed position, both balancing spring 171 and motor 166 act against the weight of rearview mirror 110, while when motor 166 moves mounting plate 154 into the downwardly-directed position, the motor 166 and the weight of rearview mirror 166 collectively compress balancing spring 171. Although balancing spring 171 is depicted as a torsion spring positioned about hinge 156, a compression spring can be positioned between socket plate 126 and mounting plate 154 adjacent second end 130 thereof, for example.

Figure 18:
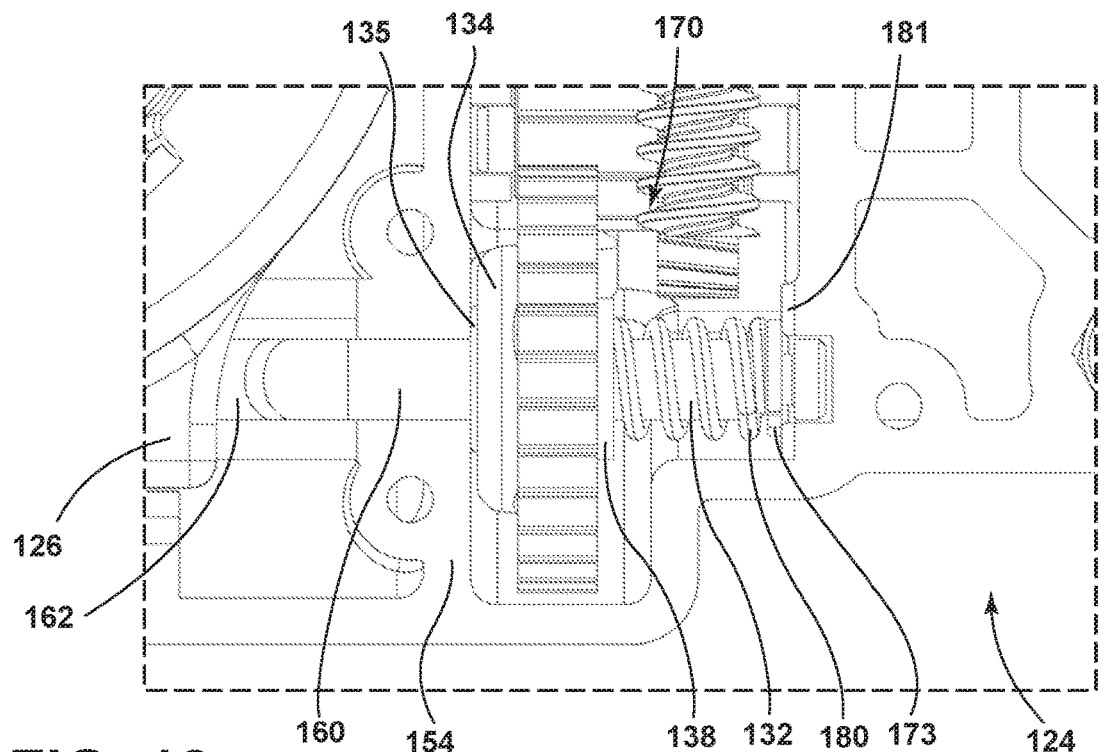
FIG. 18 is detail view of a portion of a clutch assembly of the actuation mechanism.

Turning to FIG. 18, modifications to components associates with the clutch functionality described above can be made to tune the operation thereof. In particular, a c-clip 173 or the like can be positioned between rib 181 and spring 180 to improve loading of spring 180 and to reduce friction and/or wear between spring 180 and rib 181. Further, clutch plate 134 can include a reduced diameter friction plate portion 135 between clutch plate 134 and the adjacent portion of mounting plate 154 such that the spring 180 loads the friction plate portion 135 against mounting plate 154. In this manner, the diameter and/or material properties of friction plate portion 135 can be adjusted to provide a desired level of friction between friction plate portion 135 and mounting plate 154 to oppose rotation of clutch plate 134 and, accordingly, link element 132 (which can apply a load on motor 166, as discussed above), during the above-described over-rotation of input element 138 when rearview mirror 110 is in either the upwardly- or downwardly-directed position. The tuning of friction plate portion 155 can further create controlled frictional drag to maintain tooth contact during cycling between positions and reduce noise.

Figure 19:
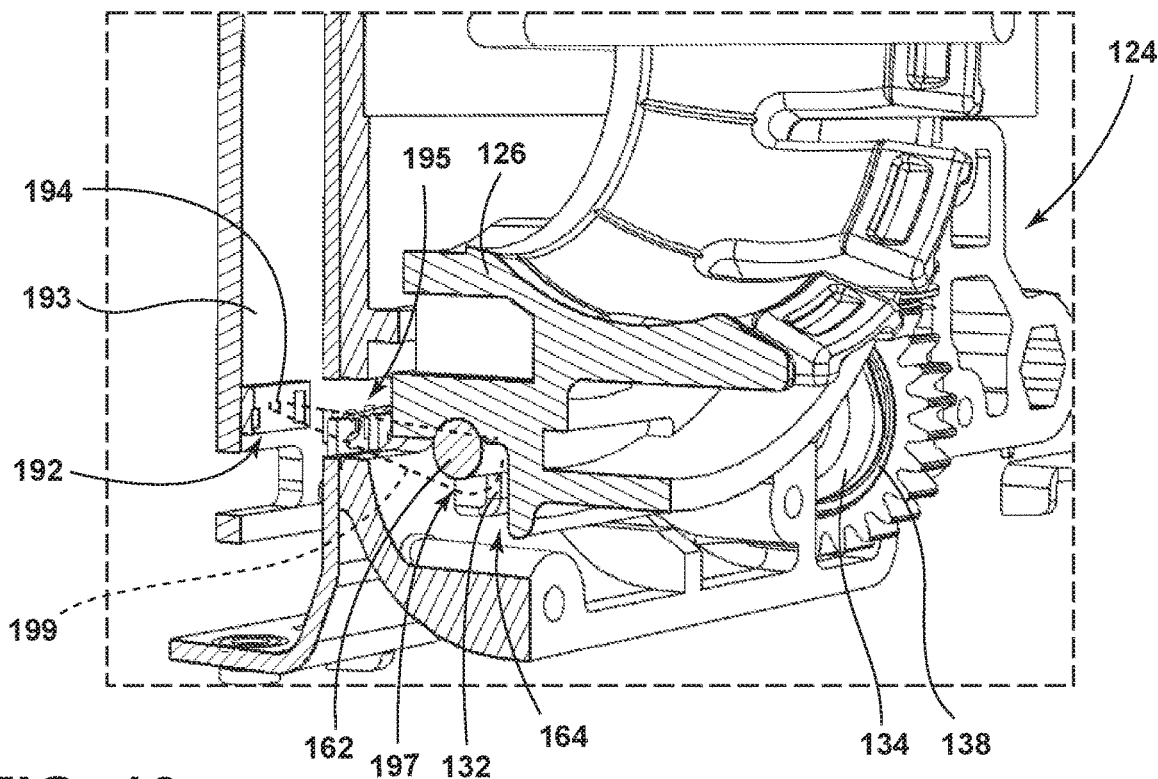
FIG. 19 is detail cross-section view of a portion of the clutch assembly of the actuation mechanism.

Finally, turning now to FIG. 19, an alternative implementation for the detection mechanism 192 is shown in which an infrared sensor 194 is included on a printed circuit board 193 associated with rearview mirror 10 (including the operation of motor 166 or the associated display substrate). Successive apertures 195 and 197 are positioned within mounting plate 154 and the slot 164 portion of socket plate 126 such that an optical path 199 is afforded for infrared sensor 194 to monitor the positioning of inner portion 162 of link element 132 during movement thereof. In this manner, detection mechanism 192 can directly monitor the movement of link element 132 between positions associated with the movement of rearview mirror 110 for the various purposes described above.

Figure 2:
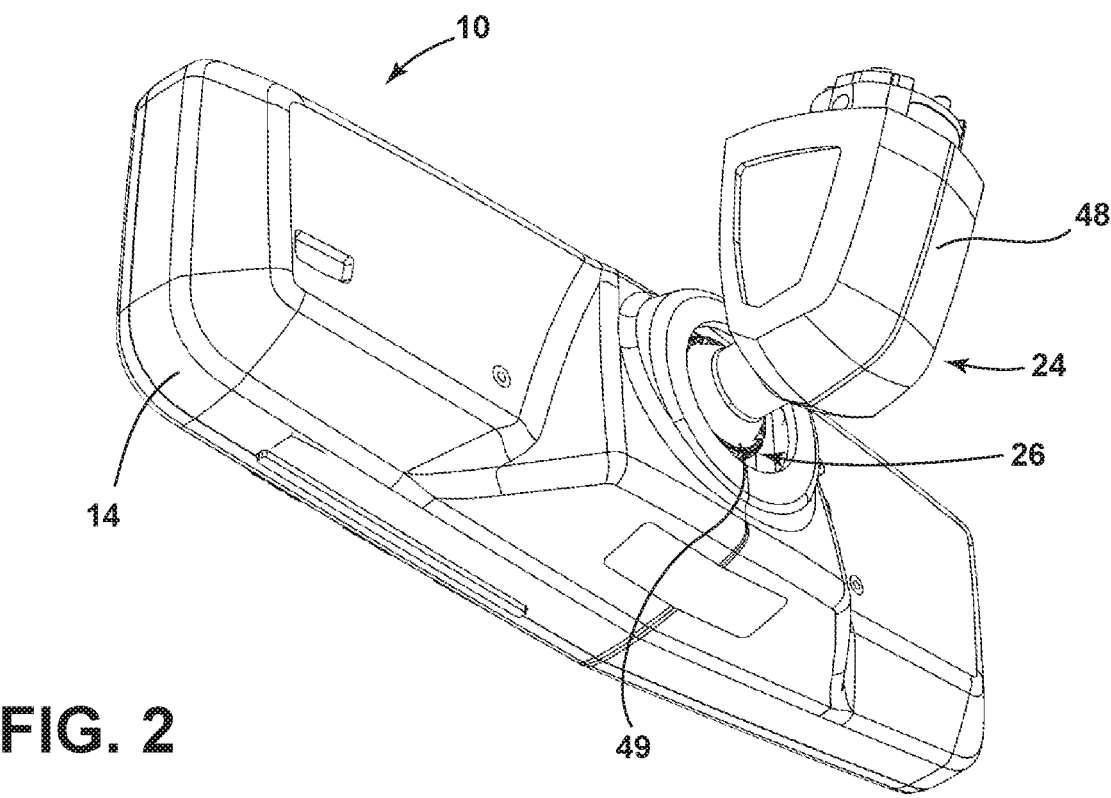
FIG. 2 is a back perspective view of the rearview mirror of FIG. 1.
Figure 20:
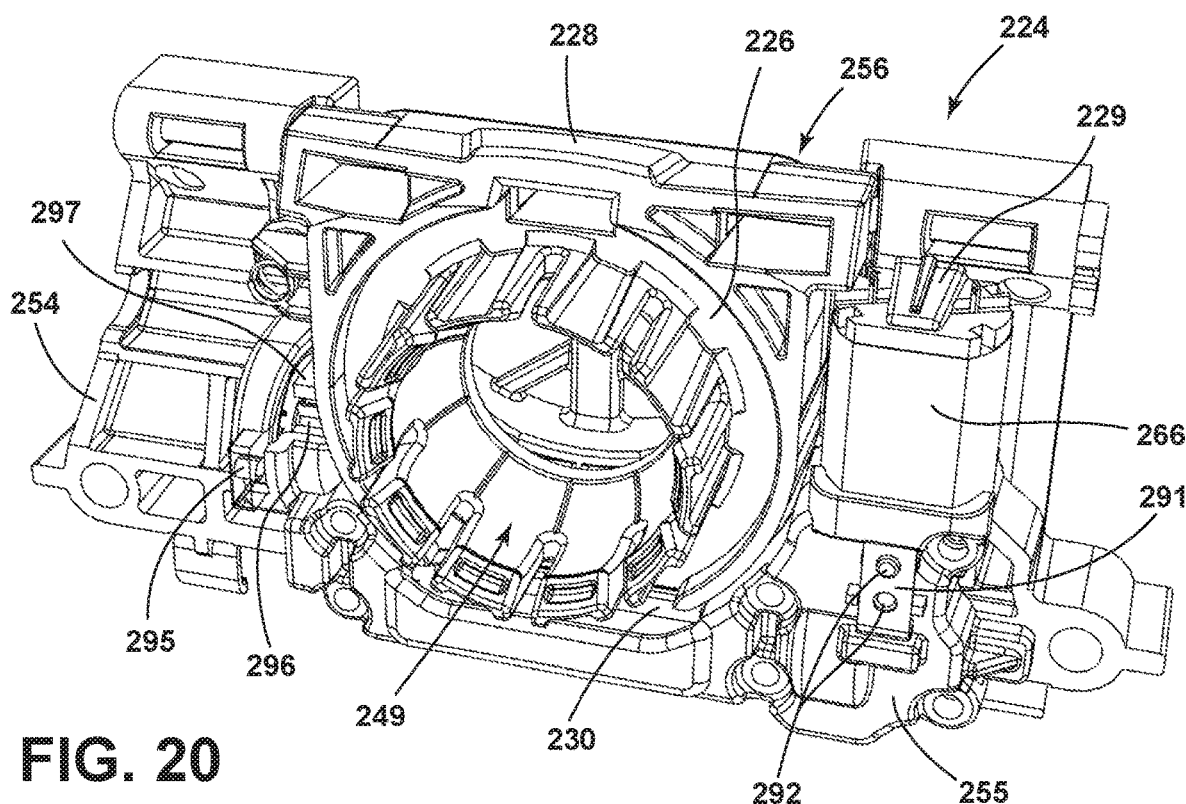
FIG. 20 is a back perspective view of an alternative actuation mechanism according to further aspects of the disclosure.

Turning generally to FIGS. 20-23, another embodiment of an actuation mechanism 224 according to the present disclosure is generally similar to that which is described in connection with FIGS. 4-15 and 16-18, with similar reference numbers indicating similar features, unless otherwise indicated herein, and similarly useable in connection with a rearview mirror 10, as depicted in FIGS. 1-3. As shown in FIG. 20, similar to the previously described embodiment, actuation mechanism includes a socket plate 226 rotatably coupled with a substrate having a reflective surface and, optionally, a display, at a first end 228 of the socket plate 226 and extending to a second end 230. Actuation mechanism 224 also includes a link element 232 rotatably coupled within the cavity 216 of the housing 214 adjacent the second end 230 of the socket plate 226 and engaged with the socket plate 226 to rotate the socket plate 226 about the first end 228 by rotation of the link element 232. Actuation mechanism 224 further includes a clutch plate 234 rigidly coupled with the link element 232 about an axis 336 thereof and an input element 238 positioned on, rotatable about, and slideable along the axis 236 of the link element 232, the input element 238 releasably engaging the clutch plate 234 under a force applied thereto along the axis 236.

Figure 21:
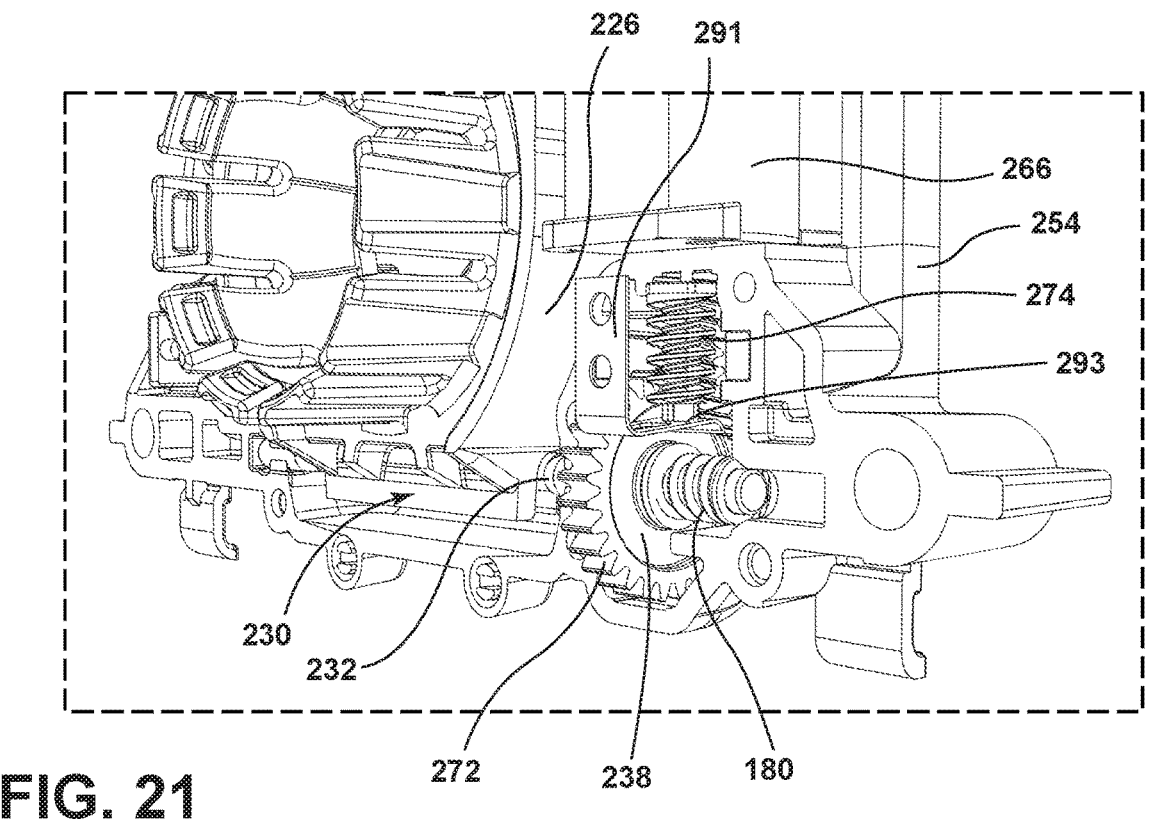
FIG. 21 is an detail perspective view showing internal components of the actuation mechanism.

As can further be seen, the actuation mechanism 224 of the present embodiment includes a spring bracket 291 coupled with and extending into cover 255. In one example spring bracket 291 can be coupled on an exterior of cover 255 adjacent a lower end of motor 266 using heat stakes 292 or the like. As shown in FIG. 21, spring bracket 291 is bent inwardly adjacent a portion thereof that extends inwardly into cover 255 and defines a notch 293 or the like that engages with a free end of worm gear 274 opposite the output 276 of motor 266. In this manner, spring bracket 291 can engage with worm gear 274 and can apply an upward force (i.e., toward motor 266) thereon, which is, accordingly, transferred to output 276 of motor 266. This arrangement biases the output shaft 276 against a thrust bearing within the housing of motor 266 at an end opposite from spring bracket 291. The biasing of output shaft 276 by spring 291 in this manner helps to counteract the force applied to output shaft 276 by worm gear 274 during initial rotation thereof under force of motor 266 or during a change in direction of motor 266, such force being applied along the axis of shaft 276 due to the angle of the worm gear 274 thread. By maintaining output shaft 276 against the thrust bearing opposite worm gear 274, the output shaft 276 is prevented from alternately moving into alternating contact between thrust bearings at opposite ends of the housing of motor 266 and can, accordingly reduce noise within actuation mechanism 224.

Figure 22:
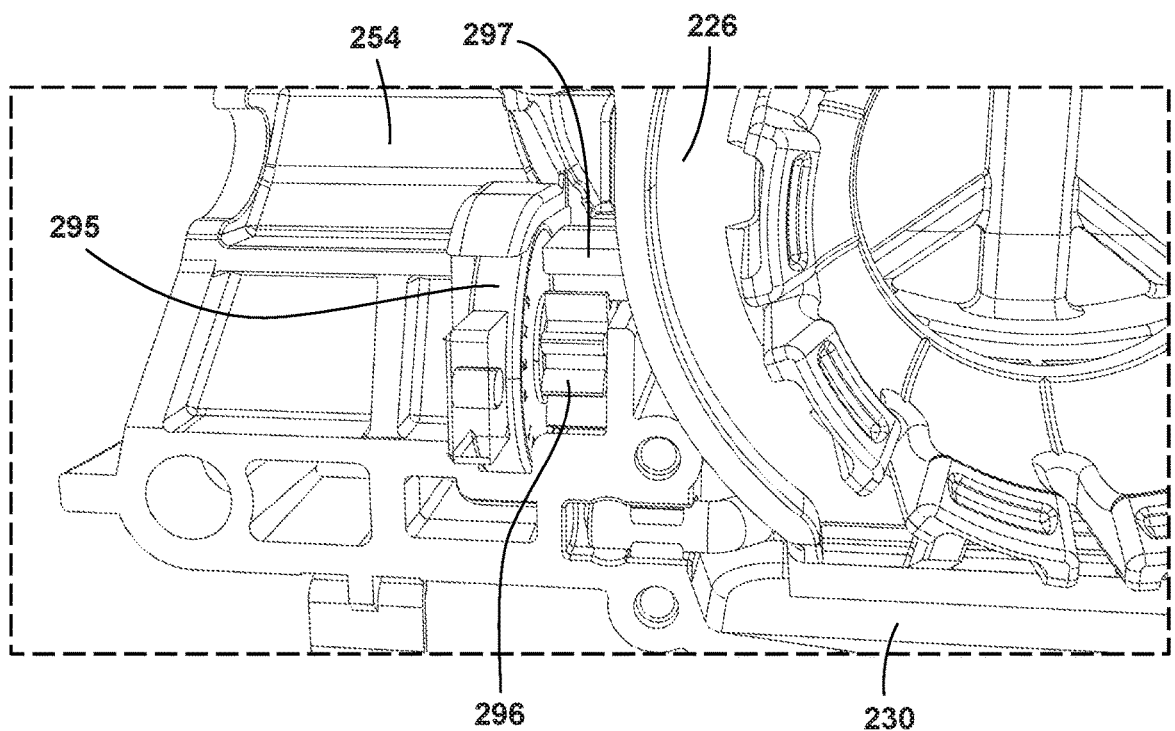
FIG. 22 is a further detail perspective view showing additional internal components of the actuation mechanism.
Figure 23:
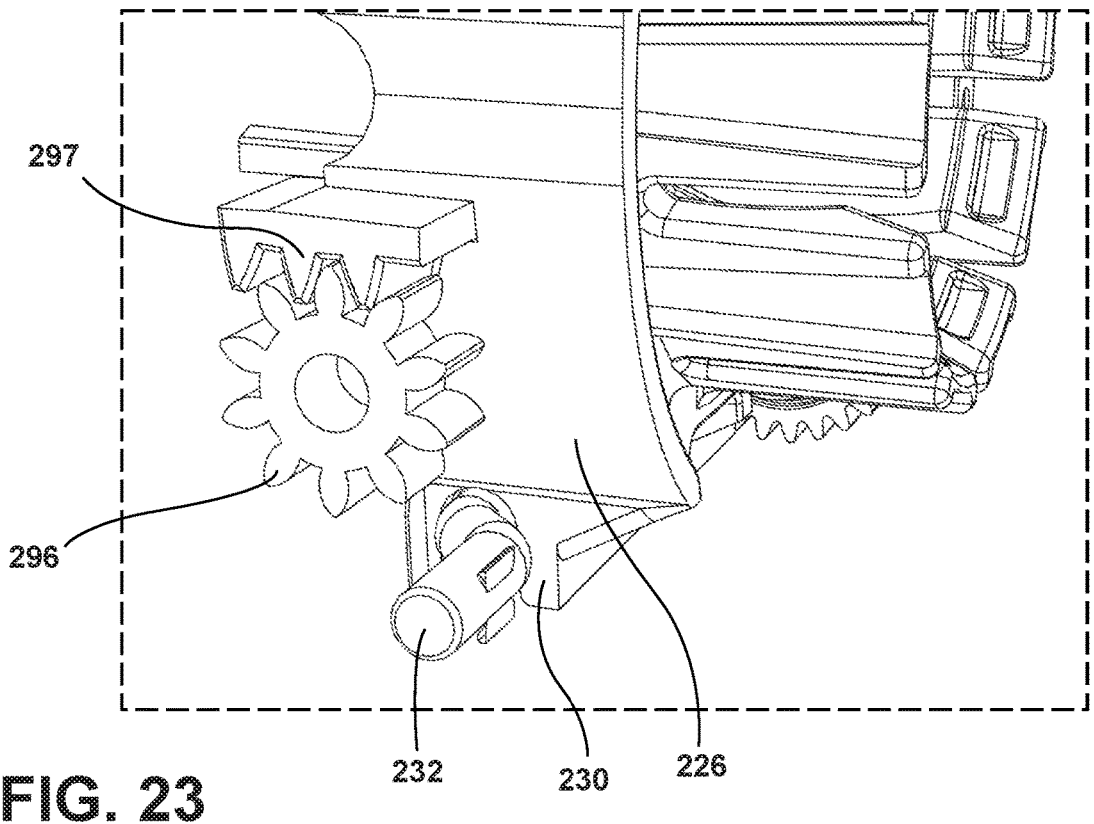
FIG. 23 is a further detail perspective view showing additional internal components of the actuation mechanism.

Turning to FIGS. 22 and 23, actuation mechanism 224 can also include a damper 295 operably engaged between socket plate 226 and mounting plate 254. In the particular implementation illustrated, damper 295 is a viscous damper, although other types of dampers may be used suitably in the present arrangement. Damper 295 is fixedly coupled with mounting plate 254 and includes a gear 296 coupled with an input end thereof. Gear 296 operably engages with a gear rack 297 integrally formed with socket plate 226 such that damper 295 applies a load between mounting plate 254 and spring plate during relative movement of gear rack 297 with respect to gear 296. In this manner, damper 295 can apply a continuous load through link element 232 and reduction mechanism 270 against movement of motor 266 during driving of actuation mechanism 224 between the above-described positions. This continuous loading can improve control of motor 266 during operation thereof and can provide a smoother movement of the mirror substrate and housing by way of motor 266 within actuation mechanism 224 as described herein.

With further respect to the control of motor 266 discussed herein, it is noted that at least in the present arrangement, the embodiments of position sensor 94 and 294 discussed above may be eliminated. The control of motor 226 by the corresponding electronic circuitry (e.g. circuitry 44 in FIG. 3) can instead be carried out directly by monitoring the operating speed of motor 266 using a circuit within the overall electronic circuitry used to control motor 266. In particular, the circuitry can be adapted to periodically turn off the voltage applied to drive motor 266 and to measure the back electromotive force generated by motor 266 as it continues to rotate before the voltage is reactivated. In one aspect, this measurement allows for closed loop speed control of motor 266. Further, the speed measurement can be integrated over the operating interval of motor 266 to monitor the position of motor 266, which can be used in a manner correlated with the position of socket plate 226 and/or substrate for use in determining the position thereof in operation of motor 266. Additionally, the current draw of motor 266 can be measured during operation thereof to determine the torque applied against motor 266 by reduction mechanism 270 by way of input element 232. The information obtained, thusly, can further help to determine when either of the desired end points for motor 266 has been reached, including the above-described over-rotation for loading of the clutch mechanism, as the movement of clutch plate 234 against the biasing thereof will increase the load on motor 266 by a known amount. It is noted that such a scheme can be used to control the actuation mechanisms described above in connection with FIGS. 4-15 and 16-18 in substitution for the position sensors described in connection therewith.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A rearview mirror for a vehicle, comprising:
   a substrate having a reflective surface thereon; and
   an actuation mechanism coupled with the substrate and including:
      a socket plate rotatably coupled with the substrate at a first end thereof and extending to a second end;
      a link element rotatably coupled with the substrate adjacent the second end of the socket plate, the link element being engaged with the socket plate to rotate the socket plate about the first end by rotation of the link element;
      a clutch plate rigidly coupled with the link element about an axis thereof and defining a plurality of undulations extending in the direction of the axis and radially spaced around the axis; and
      an input element including a friction plate having a plurality of undulations equal in number to the undulations of the clutch plate and positioned on, rotatable about, and slideable along an axis of the link element, the input element releaseably engaging the clutch plate under a force applied thereto along the axis by the undulations of the friction plate moving out of phase with the undulations of the clutch plate.

2. The rearview mirror of claim 1, further including a motor operably engaged with the input element.

3. The rearview mirror of claim 2, wherein:
   the input element includes a gear; and
   the motor is operably engaged with the input element by a reduction mechanism including a worm gear.

4. The rearview mirror of claim 1, wherein
   when input element releaseably engages the clutch plate, the undulations of the friction plate are 90 degrees out of phase with the undulations of the clutch plate.

5. The rearview mirror of claim 4, wherein:
   the friction plate is biased toward the clutch plate to urge the friction plate and the clutch plate into a position wherein the input element releaseably engages the clutch plate; and
   the friction plate releases the engagement with the clutch plate by opposing the biasing toward the clutch plate under a predetermined force applied on the input element.

6. The rearview mirror of claim 1, wherein the actuation mechanism further includes:
   a mounting plate coupled with the substrate, the socket plate being coupled with the substrate by way of the mounting plate; and
   a damper operably engaged between the socket plate and the mounting plate.

7. The rearview mirror of claim 6,
   wherein the actuation mechanism rotates the link element to drive movement of the substrate between first and second operative positions relative to the socket plate; and
   the actuation mechanism is in communication with the position sensor to determine when the substrate is in either of the first and second operative positions.

8. The rearview mirror of claim 7, wherein:
   the socket plate defines a socket therein having a closed end, the link element engaging with the socket of the socket plate to rotate the socket plate about the first end by rotation of the link element and contacting the closed end of the socket in both of the first and second operative positions; and
   the actuation mechanism rotates past a position corresponding with the link element contacting the closed end of the socket by a predetermined amount when the position sensor indicates that the substrate is in one of the first and second operative positions.

9. A vehicle, comprising:
   an imaging system including a rear view camera;
   a windshield; and
   a rearview mirror mounted adjacent the windshield and including:
      a substrate having a reflective surface thereon; and
      an actuation mechanism coupled with the substrate and including:
         a socket plate rotatably coupled with the substrate at a first end thereof and extending to a second end;
         a link element rotatably coupled with the substrate adjacent the second end of the socket plate and engaged with the socket plate to rotate the socket plate about the first end by rotation of the link element;

a clutch plate rigidly coupled with the link element about an axis thereof and defining a plurality of undulations extending in the direction of the axis and radially spaced around the axis; and an input element including a friction plate having a plurality of undulations equal in number to the undulations of the clutch plate and positioned on, rotatable about, and slideable along an axis of the link element, the input element releaseably engaging the clutch plate under a force applied thereto along the axis by the undulations of the friction plate moving out of phase with the undulations of the clutch plate.

10. The vehicle of claim 9, wherein:

the rearview mirror further includes a motor operably engaged with the input element;

the input element includes a gear; and the motor is operably engaged with the input element by a reduction mechanism including a worm gear.

11. The vehicle of claim 9, wherein when input element releasably engages the clutch plate, the undulations of the friction plate are 90 degrees out of phase with the undulations of the clutch plate.

12. The vehicle of claim 11, wherein:

the friction plate is biased toward the clutch plate to urge the friction plate and the clutch plate into a position wherein the input element releaseably engages the clutch plate; and the friction plate releases the engagement with the clutch plate by opposing the biasing toward the clutch plate under a predetermined force applied on the input element.

13. The vehicle of claim 9, wherein:

the substrate is a display substrate in communication with the imaging system for displaying an image received from the camera when the camera is in an active state; and the imaging system further includes a controller in communication with the actuation mechanism to rotate the link element to drive movement of the substrate between first and second operative positions relative to the socket plate, the first and second operative positions respectively corresponding with the active state and an inactive state of the imaging system.

14. The vehicle of claim 13, wherein the actuation mechanism further includes a position sensor in communication with the controller and useable by the controller to determine when the substrate is in one of the first and second operative positions.

15. The vehicle of claim 14, wherein:

the socket plate defines a socket therein having a closed end, the link element engaging with the socket of the socket plate to rotate the socket plate about the first end by rotation of the link element and contacting the closed end of the socket in both of the first and second operative positions; and the controller causes the actuation mechanism to rotate past a position corresponding with the link element contacting the closed end of the socket by a predetermined amount when the position sensor indicates that the substrate is in one of the first and second operative positions.

16. A method for moving a mirror substrate, comprising:

causing rotation of an input element, the input element being coupled with a link element by way of a clutch plate rigidly coupled with the link element about an axis thereof, the input element being positioned on, rotatable about, and slideable along the axis of the link element with the input element releaseably engaging the clutch plate under a force applied thereto along the axis, the rotation of the input element being such that the input element remains releaseably engaged with the clutch plate; and causing further rotation of the input element in excess of a range of motion defined by the engagement between the link element and the socket plate, thereby causing movement of the input element along the axis in a direction away from the clutch plate against the force, wherein:

the clutch plate defines a plurality of undulations extending in the direction of the axis and radially spaced around the axis;

the input element includes a friction plate having a plurality of undulations equal in number to the undulations of the clutch plate; and when input element releaseably engages the clutch plate, the undulations of the friction plate are 90 degrees out of phase with the undulations of the clutch plate.

17. The method of claim 16, wherein:

the input element and link element are included in an actuation mechanism coupled with the substrate, link element being rotatably coupled along a fixed axis with respect to the substrate;

the actuation mechanism further includes a socket plate fixed at a first end with the substrate; and rotation of the input element causes the link element to rotate the substrate away from a second end of the socket plate by engagement with a socket defined in the second end of the socket plate.

* * * * *